United States Patent

[11] 3,622,863

| [72] | Inventor | Kenneth G. King<br>London, England |
| --- | --- | --- |
| [21] | Appl. No. | 30,864 |
| [22] | Filed | Apr. 22, 1970 |
| [45] | Patented | Nov. 23, 1971 |
| [73] | Assignee | Westinghouse Brake and Signal Company, Limited<br>London, England |
| [32] | Priority | May 29, 1969 |
| [33] | | Great Britain |
| [31] | | 27379/69 |

[54] CONTROLLABLE RECTIFIER CIRCUITS WITH ENERGY RECOVERY NETWORKS
7 Claims, 12 Drawing Figs.

[52] U.S. Cl. .................................................. 321/45 ER, 321/5, 321/45 C
[51] Int. Cl. .................................................. H02m 7/52
[50] Field of Search .................................................. 321/5, 44, 45 R, 45 C, 45 ER; 318/227

[56] References Cited
UNITED STATES PATENTS

| 3,263,152 | 7/1966 | Walker | 321/45 C |
| 3,460,021 | 8/1969 | Schlabach | 321/45 C |
| 3,469,169 | 9/1969 | Schlabach et al. | 321/45 X |
| 3,504,266 | 3/1970 | Schlabach et al. | 321/45 ER |

FOREIGN PATENTS

| 1,381,949 | 11/1964 | France | 321/5 |

*Primary Examiner*—William H. Beha, Jr.
*Attorney*—Larson, Taylor and Hinds

ABSTRACT: A controllable rectifier circuit includes SCRs for intermittently supplying current from input terminals to output terminals through a current limiting inductance. A commutating capacitor provided with a switching device connected in series therewith intermittently initiates a turnoff process in which current flow in the inductance is diverted from the SCRs to permit them to acquire a forward blocking condition. A unidirectionally conductive reactive current path connected between the input and output terminals enables return of reactive energy in a load to the input terminals and a saturable transformer, having a first winding connected in a path across the inductance and a second winding coupled through a diode to the input terminals, is arranged to undergo a similar voltage time integral to that which the inductance undergoes during the turnoff process and thereby enables a return of surplus energy acquired by the inductance to the input terminals during the resetting thereof towards saturation.

CONTROLLABLE RECTIFIER CIRCUITS WITH ENERGY RECOVERY NETWORKS

This invention relates to controllable rectifier circuits and relates especially but not necessarily exclusively to inverter circuits employing controllable rectifiers.

In controllable rectifier inverter circuits, it is commonplace to employ semiconductor controllable rectifier devices which are rendered conducting either in turn or in turn in groups to apply current from DC input terminals alternately in opposite directions to give rise to alternating current in a load connected to the output terminals. Such circuits frequently employ current limiting or commutating inductances between the input terminals and the controllable rectifier devices and one or more commutating capacitors which are connectable intermittently via suitable switching means to divert current in the inductance or inductances from the controllable rectifier devices to enable the latter to recover their forward block capability. It is in the nature of many such circuits that in the turn-off or commutation process, current is drawn from the supply via the commutating inductance or inductances into the commutating capacitor and an increment of current is hereby produced in the commutating inductance for each cycle of operation of the arrangement and can give rise to excessive losses in the circuit or even failure to commutate or inadvertent break over of the controllable rectifier devices.

The establishment of such increments of current is facilitated furthermore by the accepted practice of including in such inverters unidirectionally conductive current feedback paths for carrying reactive currents which exist in inductive loads connected to the output terminals when the controllable rectifier devices are rendered nonconducting. It is desirable moreover that energy stored in the commutating inductance or inductances during the commutation process shall be returnable to the input terminals.

According to the present invention there is provided a controllable rectifier circuit including controllable rectifier means operable intermittently to supply current from input terminals to output terminals via a current limiting or commutating inductance, a commutating capacitance being provided with switching means in series therewith intermittently operable to initiate a turn-off process in which it diverts current flow in the inductance from the controllable rectifier means to enable the controllable rectifier means to acquire a forward blocking condition, a unidirectionally conductive reactive current path or circuit also being provided between the output and the input terminals via which reactive energy in the load when connected to the output terminals is returnable to the input terminals, and a saturable transformer having one winding connected in a path across the inductance and another winding coupled via a unidirectionally conductive path to the input terminals and arranged to undergo a similar voltage time integral to that which the inductance undergoes during the turn-off process and thereby enable during resetting thereof towards saturation return to the input terminals of surplus energy acquired by the inductance.

Although not essential to the invention, the unidirectionally conductive reactive current path from the output terminals may preferably be coupled to the input terminals via the saturable transformer.

In the case of an input commutated inverter of a type to be described hereafter, saturation of the saturable transformer at desired instants following a turn-off process may be ensured by arranging suitable biassing means for the transformer.

Overswing of voltage on the commutating capacitor following a commutation process may be limited in an inverter circuit employing the invention either by the provision of separate clamping devices to clamp the overswing voltage at a desired point of the operation alternatively, where possible, by their being fired at the appropriate point, other controllable rectifier devices in the inverter circuit can provide such limitation.

In an input commutated type of inverter, employing the invention, it may be that reactive load current is still flowing in one side of the circuit when commutation is required in the other side of the circuit and this can lead to inadequate resetting of the respective saturable transformer. This problem can be reduced by providing suitable current limiting means capable not only of permitting unimpeded flow of reactive current but also of supporting commutation voltages without substantial loss of current from the commutation capacitor.

In order that the present invention may be more clearly understood and readily carried into effect, the same will be further described by way of examples with reference to the accompanying drawings in which:

FIGS 5a, b, c and d illustrate modifications of the circuit arrangement of FIG. 3.

Figure 1:
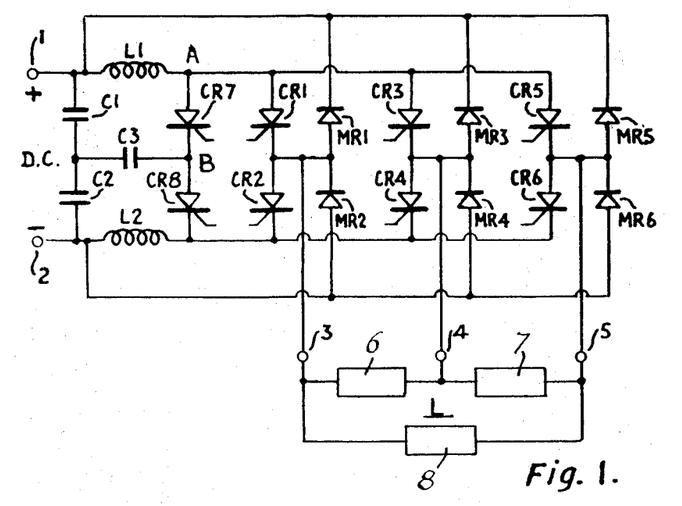
FIG. 1 illustrates one form of inverter circuit to which the invention is applicable.

Referring to FIG. 1, this illustrates a form of three-phase bridge type of inverter with single-sided input commutation. The inverter has input terminals 1 and 2, 1 being connected via a current limiting or commutating inductor L1 to the anodes of upper controllable rectifier devices CR1, CR3 and CR5 and 2 being connected via similar inductance L2 to the cathodes of lower controllable rectifier devices CR2, CR4 and CR6. The six devices are arranged in a bridge configuration as shown. The interconnection of CR1 and CR2 is connected to an output terminal 3, that of CR3 and CR4 is connected to an output terminal 4 and that of CR5 and CR6 is connected to an output terminal 5. Limbs of a load L are denoted 6, 7 and 8 and connected between terminals 3 and 4, 4 and 5 and 3 and 5 respectively. The load is assumed to be both inductive and resistive. From the output terminal 3 reactive current feed-back paths are provided via diodes MR1 and MR2 to the input terminals 1 and 2 respectively and similar reactive feed-back paths via diodes MR3 and MR4 and MR5 and MR6 are provided in respect of the output terminals 4 and 5. Across the input terminals 1 and 2 there is provided an input capacitance in the form of a split capacitor formed by capacitors C1 and C2 the junction of C1 and C2 having one terminal of a commutating capacitor C3 connected to it. The other terminal of the commutating capacitor C3 is connected to the junction of two further controllable rectifiers CR7 and CR8 forming commutation switching devices. The anode and cathode of CR7 and CR8 respectively are connected to the output side of the respective commutating inductance L1 or L2.

Suitable firing circuits are provided but not shown for the controllable rectifier devices CR1 to CR8 and in the present part of the description, it will be assumed that no provision is made for variation of firing angle for the controllable rectifier devices CR1 to CR6 of the bridge but that firing of these devices is effected in the required order having regard to the desired output frequency, following completion of each successive commutation interval.

In operation of the arrangement of FIG. 1 the normal pattern of conduction of the controllable rectifier devices CR1 to CR6 is such that at least one of the upper devices and one of the lower devices or vice versa, are conducting at any given instant (except during the commutation intervals) and thereby six possible combinations of conducting conditions of the arms of the bridge are produced.

Turnoff of the controllable rectifier devices is achieved by suitable firing of the controllable rectifier devices CR7 and CR8 which are rendered conducting alternately. Each of these devices is therefore rendered conducting three times for each output cycle of the inverter to connect an appropriately charged commutating capacitor C3 to the input of the inverter bridge on the side where two devices are in the conducting condition. If therefore the devices CR1, CR3 and CR6 are conducting, the capacitor C3 which is assumed charged negatively at the terminal thereof connected to CR7 is connected by triggering the device CR7 into the conducting condition to the positive input line to the inverter bridge. This renders nonconducting one or more of the upper controllable rectifier devices depending on which are initially conducting.

In order to achieve this commutation it is not only necessary that the commutating capacitor C3 be charged in the sense stated, namely negative at the cathode of CR7 but also that the potential on the capacitor before this commutation is substantially negative relative to the negative supply terminal. Thus, supposing that the device CR1 is being commutated into the nonconducting condition, the cathode of CR1 is clamped to the negative supply line via the diode MR2 and the excess potential on the capacitor C3 appears as a reverse turn-off voltage across CR1.

Figure 2:
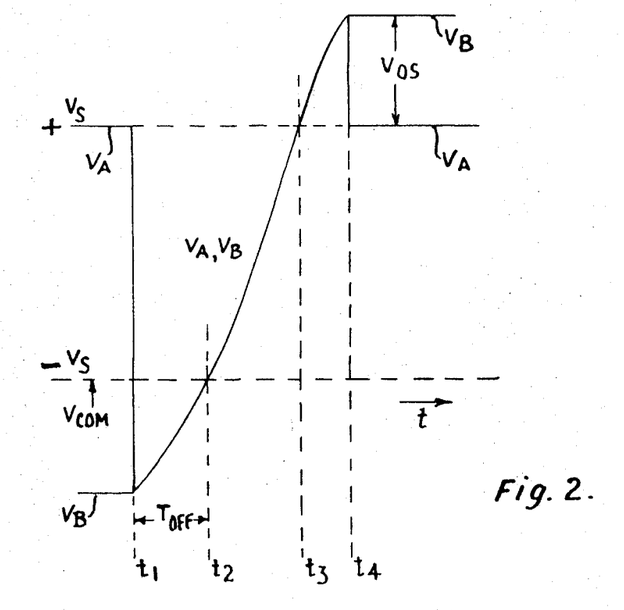
FIG. 2 illustrates diagrammatically the operation of FIG. 1

The operation of the circuit of FIG. 1 may be further clarified by the diagrammatical illustration of FIG. 2. In FIG. 2, the variations of the potentials at the points A and B namely the right-hand sides of the inductor L1 and the capacitor C3 are shown.

In order that the commutating capacitor shall be charged following a commutation process such as referred to above, the voltage at B, VB is required to be allowed to overswing by an amount VOS given by $VB-VA=VCS=Vcom$ (where $Vcom$ = the commutation capacitor voltage.)

This defines the point T4 at which an appropriate upper controllable rectifier device in the inverter arrangement is required to be fired. This having been achieved, the voltage across the commutating inductance L1, which is the potential difference (VS+) minus VA, is reduced to substantially zero and furthermore, as a result of the commutating process L1 experiences a large net voltage time integral because the negative area under the VA curve from t3 to t4 is much less than the positive area t1 to t3. This attained an increment of current in the commutating inductance L1 which is permitted to flow through the closed path presented by whichever of the upper controllable rectifier devices is conducting and the corresponding reactive current diode (MR1, MR3, MR5). During successive such commutation, in particular if the commutating frequency is relatively high, in the absence of means for preventing it, the current in the commutating inductances L1 and L2 tends to build up step by step until a state of equilibrium is reached. Furthermore, such equilibrium is reached. Furthermore, such equilibrium tends not to be reached before the current has attained such a high level that commutation is prevented by the attendant reduction in turn off time.

It will be appreciated therefore, that it is desirable to provide for reduction of the current in the inductances L1 and L2 before the current is allowed to pass round the recirculating current paths and become cumulative. It will be appreciated hereafter, that the criterion for satisfactory limitation is that at an acceptable level of current in the inductance L1 or L2, the net voltage time integral across the inductance is zero or negative. In order to achieve this the invention enables the voltage VA to be held at a positive value with respect to VS (positive) for a period following the instant t4, during which the surplus energy stored in the inductance L1 is absorbed, preferably largely by being returned to the input terminals.

Figure 3:
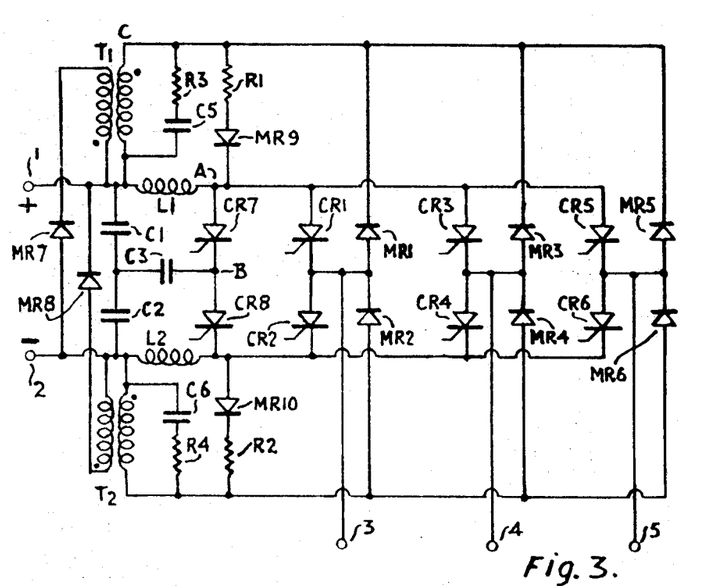
FIG. 3 illustrates a circuit embodying the invention.

Referring now to the circuit arrangement of FIG. 3 which consists of the basic converter circuit of FIG. 1 modified in accordance with one embodiment of the invention, it will be seen that saturable transformers T1 and T2 are now incorporated, the primary windings of which are connected in paths across the inductances L1 and L2 respectively. The connecting paths include respective resistors R1 and R2 and diodes MR9 and MR10. Further, the reactive current paths via the diodes MR1, MR3 and MR5 are connected to the primary winding of the transformer T1 and those via diodes MR2, MR4 and MR6 are connected to the primary winding of T2. The secondary winding of transformer T1 is connected via a diode MR7 across the input terminals and the secondary winding of transformer T2 is connected via a diode MR8 across the input terminals. Across the primary winding of T1 there is connected a small capacitor C5 in series with a damping resistor R3 and across the primary winding of T2 there is connected a small capacitor C6 in series with a damping resistor R4. These components are provided to limit transient voltages which may otherwise appear as feedback current builds up in the leakage inductances of the transformers T1 and T2.

Referring now to the operation of the circuit arrangement of FIG. 3, immediately prior to a commutation operation by firing, say, of the device CR7, the transformer T1 on the same side of the supply as the commutating controllable rectifier device R7 is assumed to be saturated in a direction such that it presents a low impedance to a positive voltage applied to the ends of the windings of the transformer which are shown dotted and which thereby indicate the sense of the windings of these transformers. Unless the operating frequency is high, the other transformer is also saturated in the same direction and therefore provides a low impedance path from point C to the negative line where C is more negative than VS–. More will be said about this hereafter. On firing of the controllable rectifier device CR7 to turn off upper controllable rectifier devices in the bridge inverter, the operation of the circuit is substantially as described previously but as the voltage at a proceeds negatively, the voltage across L1 is applied to the primary winding of saturable transformer T1 and resistor R1 via MR9 tending to drive T1 core out of saturation. The point C at the upper end of the primary winding of transformer T1 is clamped, by virtue of the reactive feedback diodes, at the negative supply potential (VS–) as long as the voltage VA is negative with respect to VS–. This clamping is achieved because of the sense of saturation, as mentioned above, of the transformer T2. The difference voltage between VA and VC therefore appears across the resistor R1 and diode MR9. The current through R1 at this stage may tend to reduce the turn-off interval slightly but the value of R1 is arranged to be as high as permissible having regard to not introducing excessive voltage drop when it is carrying only a magnetizing current of T1 at a later stage in the process. If the later is reasonably small R1 does not at any time therefore have a substantial effect.

During the time when the voltage VA is rising between VS– and VS+, namely in the period T2 to T3, the voltage at C follows it closely and when VA exceeds VS+ at the point T3, the diode MR9 is blocking and the primary winding of the transformer T1 is isolated until the next controllable rectifier device of the bridge inverter is rendered conducting when the voltage VA attains the desired overswing value. The potential at point C then is driven positively to a value determined by the supply voltage and the turns ratio of the transformer T1 and the voltage VC remains at this level for as long as current is fed back to it and T1 is unsaturated.

Figure 4:
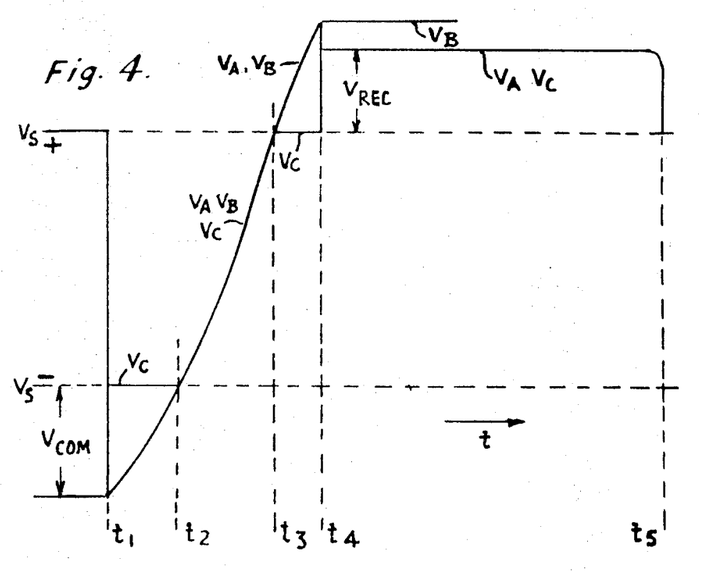
FIG. 4 is illustrative of the operation of the circuit of FIG. 3.

The arrangement may be better understood by reference to the illustrated diagrams of FIG. 4. Whilst the voltage VA at the point A and therefore the voltage at C is negative with respect to the positive supply line VS+, the transformer T1 is driven out of its initial saturation condition or reset as current increases in L1. At the instant T2, the voltage time integral across the transformer T1 is less than that across the inductance L1 owing to the clamping of the voltage at C to the potential VS– as referred to above. This discrepancy between the voltage time integral experienced by the inductance L1 and the transformer T1 is maintained up to the time t3. In the interval T3 to t4, the current in the inductance L1 reduces slightly whilst nothing changes substantially with regard to the transformer T1 because the diode MR9 is in the blocking condition for this period so that the discrepancy between the voltage time integrals across L1 and T1 is largely rectified.

On the assumption that the overswing voltage which is required is equal to the commutation voltage the period $t3$ to $t4$ is $t4$ practice therefore somewhat shorter than the period from $t1$ to $t2$, so that the compensation is not exact but the ultimate discrepancy is of little consequence in the operation of the inverter.

It may be noted at this point that the purpose of MR9 and MR10 in this particular circuit is solely to provide the above effect and these diodes are otherwise inessential.

It will be appreciated that at the instant T4, the resetting voltage time integral experienced by the transformer T1 corresponds very closely to the voltage time integral experienced by the inductance L1. From the instant T4 at which a further upper controllable rectifier is fired the transformer is further driven toward saturation and at the instant say $t5$, it saturates virtually short circuiting the inductance L1 at an acceptable current level. This is because when the transformer T1 reverts to its initial saturation condition, the total voltage time integral across it is zero and the voltage time integral across L1 is also very nearly zero and the basic criterion for determining the instant at which L1 may be short-circuited is substantially satisfied.

A number of meritorious features associated with an arrangement such as disclosed above with reference to FIG. 3 may be mentioned at this point. Firstly, the saturable energy recovery transformer s can be dimensioned only to withstand relatively small voltage time integrals, performing only the energy recovery function. Secondly, in the arrangement where the saturable transformer primary windings are included in the circulating current paths of the commutating or smoothing inductances, and thereby provide for limitation of the current, the main controllable rectifier devices of the bridge inverter can be rendered conducting as soon as the desired overswing voltage on the commutating capacitor has been attained. Thirdly, only sufficient power is returned to the recovery circuit via the saturable transformer as is necessary to prevent the build up of current in the commutating inductances.

It may be appreciated from the foregoing that for some applications a such high frequency of operation of the inverter may be required that energy recovery on one side of the inverter via one of the energy recovery saturable transformers is incomplete when commutation is initiated on the other side of the inverter. This commutation may therefore occur when the total time from $t1$ to $t5$ referred to with reference to FIG. 4 exceeds the half period between successive commutations on one side of the inverter. If this is the case, assuming again commutation by firing of the device CR7, the transformer T2 under these conditions is not saturated at the instant $t1$ and therefore the clamping conditions with regard to the point C referred to above are not satisfied. The cathodes of the upper controllable rectifier device in the inverter bridge are therefore clamped under these conditions, not to the negative supply voltage but to a voltage equal to the difference between the negative supply voltage and the positive recovery voltage during the commutation on the other side, namely that developed across the primary winding of T2. The effective commutating voltage is therefore reduced and the commutating capacitor is required to be of such a value as to maintain the turn off interval, which increases the amount of energy to be recovered. To minimize these undesirable effects, the recovery voltage that is the voltage at which energy recovery via the saturable transformer commences may be arranged to be much lower than the overswing voltage but where this is possible it is possible to increase the recovery voltage to such effect that the recovery is completed and the transformer saturated, before commutation starts on the other side of the inverter, thereby avoiding the problem. The recovery voltage should nevertheless be so reasonably high, that is not much less than the overswing voltage and that the transformer ratio is not required to be excessive and excessive reverse voltages on the recovery diodes MR7 and MR8 can be avoided. In conclusion it will be appreciated that the circuit parameters are preferably arranged that the commutation time plus the recovery time does not exceed the time between successive commutation.

For the purposes of avoiding possibilities that the inoperative transformer may not be saturated to provide the clamping conditions mentioned earlier, due to incomplete remanence in the transformer, even though recovery has been completed, a bias can advantageously be applied to the saturable transformer by suitable means.

Figures 5A, 5B:
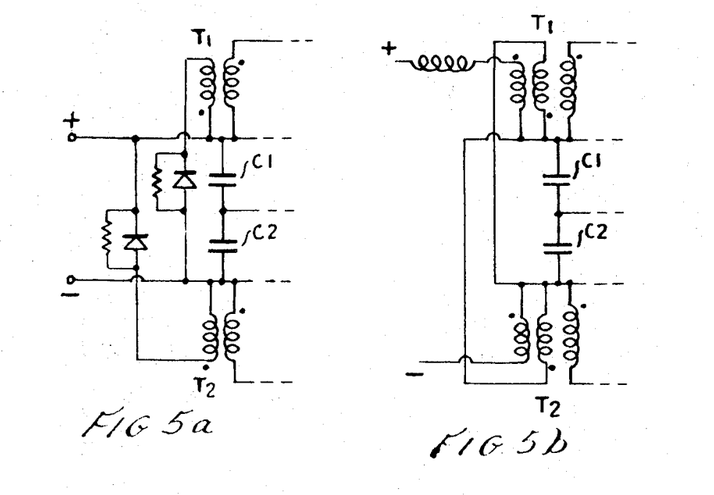
Figure 5C:
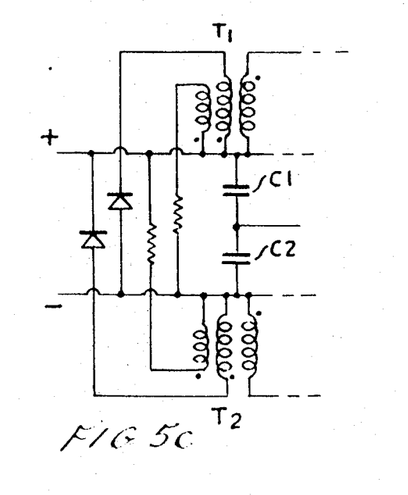

Such suitable means are illustrated in FIG. 5 at $(a)$, $(b)$ and $(c)$ and comprise the inclusion of a third winding supplied with current from a suitable source or comprise bridging the recovery diode with a resistor. The operation will be readily apparent without further description.

Figure 5D:
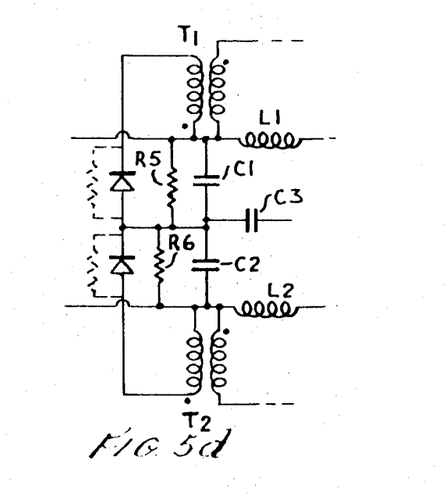

Reference may now be made to FIG. 5($d$) in which a further modification of the arrangement of FIG. 3 is illustrated. During commutation, the supply voltage in the circuit arrangement of FIG. 3 is applied to the operative saturable transformer primary winding and a corresponding voltage appears across the secondary winding. If therefore the transformer ratio of the saturable transformer T1 is $n$, the recovery diode MR7 is subjected to a reverse voltage equal to $(1+n)$ times the supply voltage. This may be excessively high bearing in mind the rating of the diode and it is preferable from the point of view of the recovery diodes MR7 and MR8 and of the windings of the transformer TR1 and TR2 to connect the secondary windings of the transformers T1 and T2 to half the supply voltage in an arrangement such as is shown in FIG. 3, where it is possible by the presence of the split input reservoir capacitor constituted by capacitors C1 and C2. The arrangement of FIG. 5($d$) which illustrates the relevant part of the circuit arrangement of FIG. 3 incorporates this proposal. In this arrangement alternative positions for the resistors R5 and R6 connected across the capacitors C1 and C2 are shown as the dotted connections across the respective recovery diodes MR7 and MR8.

Figure 6:
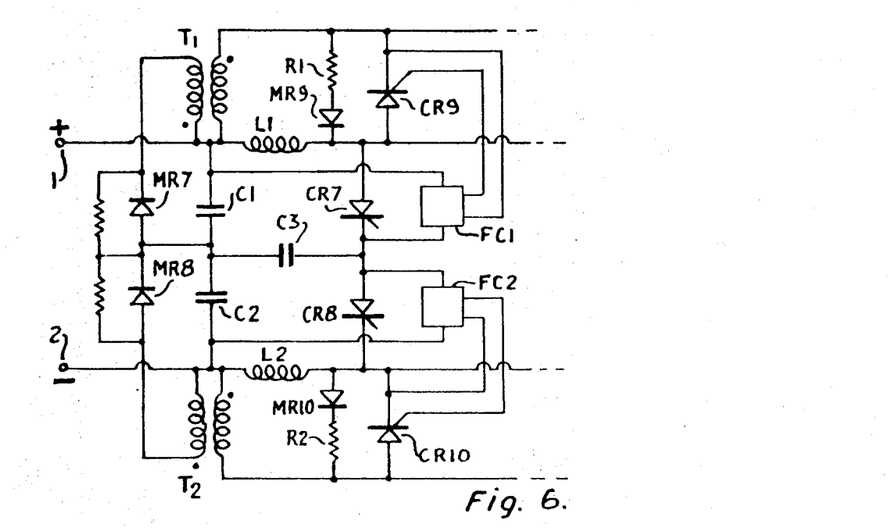
FIG. 6 illustrates a variation upon the circuit arrangement of FIG. 3 allowing variable output voltage control.

In the circuit arrangements discussed above, it will be recalled that the assumption is made that controllable rectifier devices of the inverter bridge are operated at instants corresponding to the instant T4 in FIG. 4, thereby limiting the overswing voltage on the commutating capacitor. In an arrangement however in which it is desired to delay the firing of the controllable rectifier devices in the inverter to provide for output voltage control for example, the firing of these devices cannot be relied upon to provide the requisite voltage limitation and the circuit arrangement of FIG. 6 provides additional controllable rectifier devices CR9 and CR10 across R1, MR9 and R2, MR10 respectively with associated firing circuits FC1 and FC2 constituting pulse generators responsive to the attainment of a predetermined voltage difference between the supply positive and negative and the point B. The devices CR9 and CR10 are therefore rendered conducting following the respective commutation operation on attainment of the requisite overswing voltage on the capacitor C3 and subsequent firing of the desired semiconductor controllable rectifier devices of the bridge inverter can be delayed variably to provide the requisite degree of control.

A further aspect of the basic circuit arrangement illustrated in FIG. 3 which requires consideration is connected with the fact that this circuit arrangement may tend to break down if the load which is being supplied via terminals 3, 4 and 5 has a such low power factor that reactive current is still being returned to the recovery transformer, say T1, at the instant at which a further commutation by the controllable rectifier device CR7 is initiated. Such reactive current has to flow either to the supply terminal 1 or via the resistor R1 during the commutation process and the voltage at the point C is prevented from following the voltage at the point A unless the resistor R1 is sufficiently low to introduce a negligible voltage drop with a current that may be very much larger than the magnetizing current of the saturable energy recovery transformer T1. It is not possible however to make the resistor R1 so low as this may require practice, for an excessive current may flow in it from the commutating capacitor during the period from t1 to t2 which leads to an inadequate turn-off interval. The result is therefore that the recovery transformer is not properly reset and the recovery period is insufficient.

One manner in which this shortcoming can be avoided is foreshadowed in the foregoing in an arrangement in which the reactive feedback from the load terminal is made to operate directly to the input terminals instead of via the saturable transformers. Unless however the frequency of operation is so low that it is permissable to delay the firing of the controllable rectifier devices of the bridge inverter until the end of the recovery period following the commutations on either side, it may be necessary to insert resistors into the reactive feedback current paths to achieve the current limitation which is normally achieved by the unsaturated condition of the respective saturable transformer. Such resistors give rise to a consequent serious loss of power and also a reduction in the commutation turn-off interval.

Figure 7:
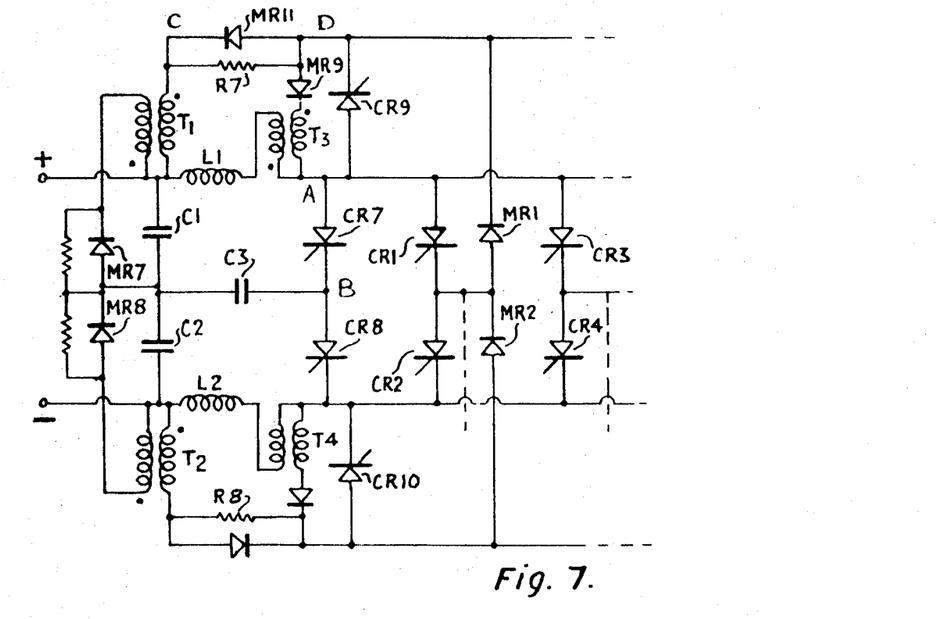
FIG. 7 illustrates a further variation on the circuit arrangement of FIG. 3 suitable for regenerative or low power factor loads, FIG. 8 illustrative of the operation of the circuit arrangement of FIG. 7

A more acceptable and efficient solution to the above shortcoming is to replace the resistors R1 and R2 by suitable current limiting devices as illustrated in FIG. 7 which shows the relevant part of the circuit suitably modified. The current limiting devices permit the reactive load current flow without appreciable voltage drop during the interval t2 to t3 but support the commutation voltage without permitting an excessive flow of current during the turn off interval t1 to t2 in the circuit shown. The current limiting devices constitute biassed satuarable transformers T3 and T4. These are biassed conveniently by biassing windings connected in series with the commutating inductors L1 and L2 respectively. Alternatively, the biassing windings may be fed from any other suitable direct current source. The saturable transformers T3 is thereby maintained in a saturated condition except for the brief period t1 to t2 during commutation when driven out of saturation by the commutating voltage which exceeds the respective supply terminal voltage at which D is clamped. Similar remarks apply to T4. The secondary windings of T1 and T2 in FIG. 7 are connected in the manner of FIG. 5(d) discussed above.

Figure 8:
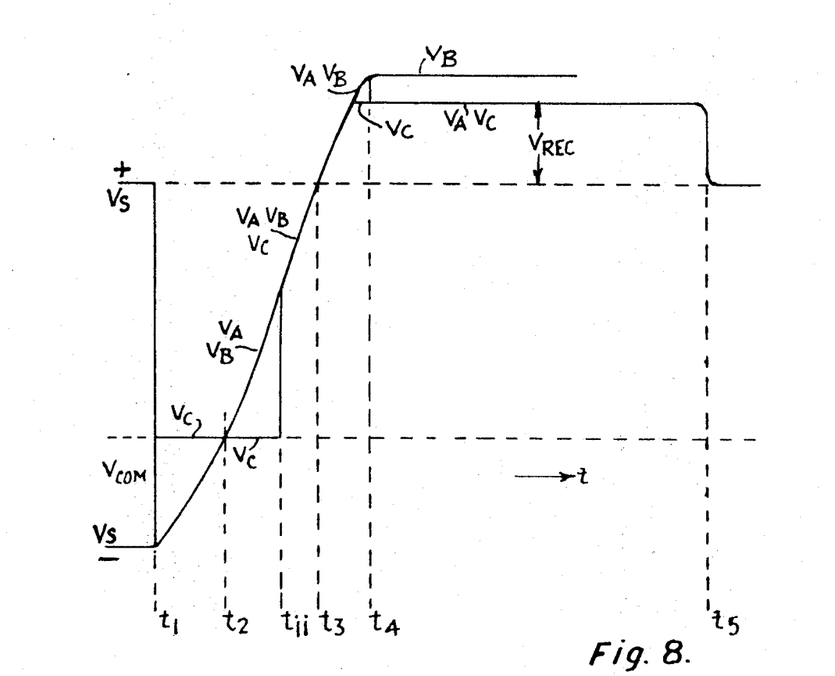

The operation of the circuit arrangement of FIG. 7 is illustrated with reference to FIG. 8, which again shows wave forms of the voltages at the points A, B and C relative to the positive and negative supply terminals for a commutation by the device CR7. When the point A moves negatively on firing of the device CR7, the saturable transformer T3 is driven out of saturation and the current flows via the diode MR9 to a limit determined by the bias current and the turns-ratio of the saturable transformer T3. The turns-ratio of T3 is so chosen that the limiting current is somewhat larger than the highest reactive feedback current at the instant of commutation, thereby ensuring that the potential of the point D can be drawn down to the negative supply terminal voltage but at the same time restricting the additional drain of charge from the commutating capacitor. At the instant t2, when the voltage at the point A has attained the negative supply terminal supply voltage, the transformer T3 is reset to an extent which corresponds to the voltage time integral bounded by the voltage VA and VS− and its ampere turn balance is maintained after t2 by virtue of current drawn through the reactive feedback diodes from the negative supply line. The voltage at the point D therefore remains clamped to the voltage of the negative supply line until an instant tii between t2 and t3 when the saturable transformer T3 reverts to its saturated condition. At this time it becomes equal to the voltage at point A and remains so until the voltage at A rises above the energy recovery voltage level. At this point the reactive load current switches to the diode MR11 and the diode MR9 is blocked allowing VA to rise further to the desired overswing voltage as defined by the firing of the clamping device CR9.

It will be appreciated from the foregoing that the saturable transformer T3 is driven out of saturation at the instant t1 by the voltage across it equal to VA− VS−, which reverses at t2 and produces a flux change in the saturable transformer T3 in the opposite direction until it saturates again at the instant tii between t2 and t3. The total voltage time integral across the transformer T3 during the commutation process is therefore zero and the voltage time integrals experienced by the recovery transformer T1 and the inductance L1 between t1 and t4 are again substantially the same apart from the effect of such voltage drop as may occur in the resistor R7, assuming that the over-voltage swing is not substantially greater than the recovery voltage.

Whilst in the above discussion of the basic circuit arrangement of FIG.3, the diodes MR9 and MR10 are indicated as of minor importance, they have an important role in the circuit arrangement of FIG. 7, since if they were to be omitted, the voltage at the point A would be limited to the recovery voltage and it will be understood that were this so it would not be possible to have a controlled overswing voltage on the commutating capacitor as discussed above and shown in FIG. 8. Further, in the circuit arrangement of FIG. 7, the components MR11 and MR12, R7 and R8 provide a low impedance path for feedback current and a path of sufficiently low impedance to the respective energy recovery transformers while limiting the fault current which can flow from the respective reservoir capacitor C1 or C2 if the devices CR7 or CR8 happen to be in the conducting condition.

In the circuit arrangements described hitherto, the inverters are of a type in which commutation is effected on the input side of the inverter but the invention is in no way limited to this form of inverter. For example the invention may be applied to a simple parallel form of inverter of the type illustrated in FIG. 9. Basically, the inverter comprises the inductances L1 and L2 as before via which the supply terminals 1 and 2 are connected to a bridge configuration of controllable rectifier devices CR1, CR2, CR3 and CR4 the diagonal of the bridge arrangement joining the interconnections of CR1, CR2 and CR3, CR4 is completed by a capacitor C1 across which the inductive and resistive load L is connected via terminals 3 and 4 as shown. Similarly to the previously described circuit arrangements, saturable energy recovery transformers T1 and T2 are provided the primary windings of which are connected in paths across the respective input current limiting inductors L1 and L2 these paths including resistors R1 and R2. The secondary windings of the transformers T1 and T2 in this case are connected in series via a single energy recovery diode MR5. Further, reactive current paths are provided via the diodes MR1, MR2, MR3 and MR4 to the energy recovery transformers as before.

Figure 9:
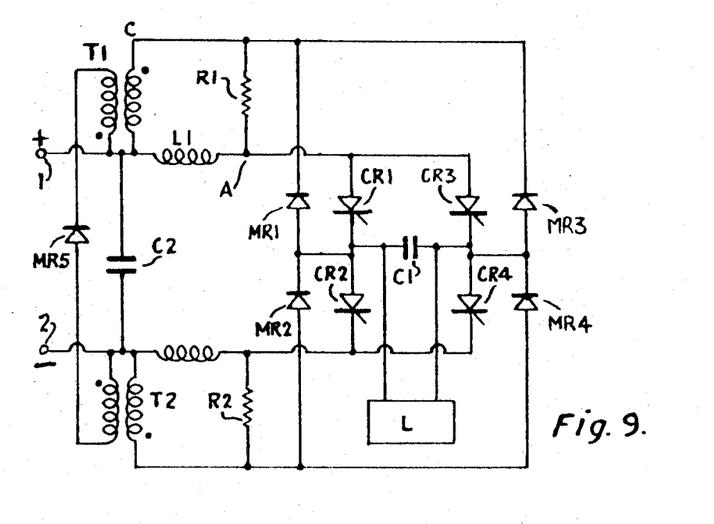
FIG. 9 illustrates the way in which the invention may be applied to a further type of inverter.

The operation of the arrangement of FIG. 9 is somewhat simpler than the operation of the previously described input commutated type of inverter in that the operation is a simple symmetrical operation and the saturable transformers T1 and T2 operate together.

Assuming initially that the controllable rectifier devices CR1 and CR4 are in their conducting condition, the capacitor C1 is charged with the left and right terminals thereof positive and negative respectively and on subsequent firing of the controllable rectifier devices CR2 and CR3, the appropriately charged capacitor C1 is presented across the devices CR1 and CR4 and current to the load is subsequently drawn in the opposite direction via CR3 and CR2, CR1 and CR4 being rendered nonconducting during the time for which the capacitor C1 presents a blocking voltage to CR1 and CR4. Following initiation of conduction of CR3 and CR2, the voltage on the right-hand side of the series choke L1, namely at the point A, descends rapidly to the potential of the right-hand plate of the capacitor C1 and the transformer T1, initially in the saturated condition, commences to be reset by virtue of the voltage applied thereto via the resistor R1. It will be appreciated that the voltage at the point C follows the voltage at the point A closely. There is no requirements for a diode in series with the resistor R1 or the resistor R2. The saturable transformer T1 and the commutating choke L1 experience similar voltage time integrals therefore and when the time integral experienced by L1 following the firing of a pair of devices in the inverter, attains a zero value, the condition of the transformer T1 is ideally a saturation condition and the inductive current in L1 such as is not immediately taken up by the load can flow freely in the reactive feedback current path via the appropriate diode MR1, MR2, MR3 or MR4.

In the parallel inverter arrangement as shown in FIG. 9 the charge on the commutating capacitor cannot be held at a level above that of the low voltage, therefore clamping controllable rectifier devices across the resistor R1 or R2 are not required in this particular circuit arrangement. Furthermore, since the operation of the circuit is essentially symmetrical, and the saturable energy recovery transformers T1 and T2 function simultaneously, and provided with the necessary interwinding insulation that is required, the transformers T1 and T2 can if desired be combined into a single transformer.

We Claim:

1. A controllable rectifier circuit including input terminals, output terminals, controllable rectifier means for intermittently supplying current from input terminals in one direction to output terminals through a current limiting inductance, means including a commutating capacitance and switching means connected in series therewith for intermittently initiating a turn-off process in which current flow in the inductance is diverted from the controllable rectifier means to enable the controllable rectifier means to acquire a forward blocking condition, a unidirectionally conductive reactive current path connected between the output and input terminals for returning reactive energy in a load to the input terminals when a load is connected across the output terminals, and a saturable transformer means having a first winding connected in a path across the inductance and a second winding coupled through a unidirectionally conductive path to the terminals, said saturable transformer undergoing a similar voltage time integral to that which the inductance undergoes during the said turn-off process and thereby enabling a return of surplus energy acquired by the inductance to the input terminals during the resetting thereof towards saturation.

2. An inverter circuit embodying a controllable rectifier circuit as claimed in claim 1 including further controllable rectifier means for operating intermittently and alternately with the first mentioned controllable rectifier means to supply current from the input terminals in the other direction to the output terminals through a further current limiting inductance, further switching means for intermittently initiating a turn-off process for the further controllable rectifier means by connecting said capacitor to divert current in said further inductance from the further controllable rectifier means to enable the said further controllable rectifier means to acquire a forward blocking condition a further unidirectionally conductive reactive current path connected between the output and input terminals for returning reactive energy in the load to the input terminals and a further saturable transformer means having one winding connected in a path across the further inductance and another winding connected in a 3. An inverter circuit as claimed in claim 2 wherein the said unidirectionally conductive reactive current paths include windings of the respective saturable transformer means.

4. An inverter circuit as claimed in claim 2 wherein the said unidirectionally conductive reactive current paths include said another windings of the respective saturable transformer means.

5. An inverter circuit as claimed in claim 2 further comprising biassing means for biassing the saturable transformers towards remanent saturation to reduce the likelihood of incomplete remanent saturation following recovery of energy in the respective inductance to a precommutation level.

6. An inverter circuit as claimed in claim 5 wherein said biassing means comprises a current conductive path between a biassing source and the respective said another windings of the transformers.

7. An inverter circuit as claimed in claim 2 wherein the respective another windings of the saturable transformers are coupled through their respective unidirectionally conductive paths across respective halves of an input circuit fed from the inverter input terminals.

8. An inverter circuit as claimed in claim 2 wherein the respective said paths across the inductances include a resistor.

9. An inverter circuit as claimed in claim 8, further comprising respective diodes connected in series with the resistors and of such polarity as to conduct during commutation when the commutation capacitor voltage exceeds the input terminal voltage.

10. An inverter circuit as claimed in claim 2 wherein the respective said paths across the inductances each include a unidirectionally conductive device and a biassed saturable transformer.

11. An inverter circuit as claimed in claim 10 further comprising respective biassing windings connected in series with the corresponding inductance for biassing said biassed saturable transformers such that these transformers function to support a commutation voltage during a turn-off interval but permit reactive load current flow in intervals following a turn-off operation.

12. A circuit as claimed in claim 1 including at least one controllable switching device connected in a path through which the inductance and the transformer primary winding are connectable in series at a predetermined overswing voltage of the capacitor so as to limit the capacitor voltage.

13. An inverter circuit embodying a controllable rectifier circuit as claimed in claim 1, wherein the said switching means in series with the commutating capacitance comprises further controllable rectifier means for operating intermittently and alternately with the first-mentioned controllable rectifier means to supply current from the input terminals to the output terminals in a direction opposite to said one direction through a further current limiting inductance, the first-mentioned controllable rectifier means, on being rendered conducting, operating to connect the capacitance to divert current flow from the further controllable rectifier means to enable the latter to acquire a forward blocking condition, said circuit further comprising a further unidirectionally conductive current path connected between the output and the input terminals for returning reactive energy in the load acquired during conduction of the further controllable rectifier means to the input terminals, the saturable transformer means having a further winding connected in a path across the further inductance, said saturable transformer undergoing a similar voltage time integral to that which the further inductance undergoes during a turn-off process of the first-mentioned controllable rectifier means and enabling, during resetting thereof towards a saturation condition, a return of surplus unidirectionally conductive path across the input terminals, said further saturable transformer undergoing a similar voltage time integral to that which the further inductance undergoes during the second-mentioned turn-off process and thereby enabling a return of surplus energy acquired by the further inductance to the input terminals.

14. An inverter circuit as claimed in claim 13, wherein the saturable transformer means comprises individual transformers, the transformer through which surplus energy is recoverable from the further inductance also having another winding connected to the input terminals through a unidirectionally conductive path.

15. An inverter circuit as claimed in claim 14 wherein, the unidirectionally conductive paths through which the said another windings are connected to the input terminals are the same.

16. An inverter circuit as claimed in claim 14 wherein, the unidirectionally conductive reactive current paths include the respective said another windings of the transformer means.

17. An inverter circuit as claimed in claim 13 wherein, said saturable transformer means comprises a composite saturable transformer through which surplus energy is returnable from each said inductance.

* * * * *